United States Patent

Möllers

[11] Patent Number: 5,323,739
[45] Date of Patent: Jun. 28, 1994

[54] ARRANGEMENT FOR ADJUSTING THE RELATIVE ROTATING POSITION OF A CAMSHAFT

[75] Inventor: Werner Möllers, Wiernsheim, Fed. Rep. of Germany

[73] Assignee: Dr. Ing. H.C.F. Porsche AG, Fed. Rep. of Germany

[21] Appl. No.: 47,417

[22] Filed: Apr. 19, 1993

[30] Foreign Application Priority Data

Apr. 21, 1992 [DE] Fed. Rep. of Germany ....... 4213038

[51] Int. Cl.⁵ .......................... F01L 1/34; F01L 1/04; F16H 7/08
[52] U.S. Cl. ........................... 123/90.15; 123/90.31; 474/110; 474/136
[58] Field of Search ............... 123/90.15, 90.17, 90.31; 474/110, 111, 117, 136

[56] References Cited

U.S. PATENT DOCUMENTS

| | | | |
|---|---|---|---|
| 3,496,918 | 2/1970 | Finlay | 123/90.15 |
| 3,888,217 | 6/1975 | Hisserich | 123/90.15 |
| 4,484,543 | 11/1984 | Maxey | 123/90.15 |
| 4,862,845 | 9/1989 | Butterfield et al. | 123/90.15 |
| 5,109,813 | 5/1992 | Trzmiel et al. | 123/90.17 |
| 5,120,278 | 6/1992 | Trzmiel et al. | 474/136 |
| 5,152,261 | 10/1992 | Butterfield et al. | 123/90.15 |
| 5,197,420 | 3/1993 | Arnold et al. | 123/90.15 |

FOREIGN PATENT DOCUMENTS

| | | |
|---|---|---|
| 3509094 | 10/1985 | Fed. Rep. of Germany ... 123/90.15 |
| 3719163C1 | 7/1988 | Fed. Rep. of Germany . |
| 8417223 | 9/1989 | Fed. Rep. of Germany . |
| 4006910 | 9/1991 | Fed. Rep. of Germany . |
| 4041785 | 6/1992 | Fed. Rep. of Germany . |
| 79046 | 5/1984 | Japan ........................ 123/90.15 |

*Primary Examiner*—E. Rollins Cross
*Assistant Examiner*—Weilun Lo
*Attorney, Agent, or Firm*—Evenson, McKeown, Edwards & Lenahan

[57] ABSTRACT

For adjusting the relative rotating position of a camshaft of a reciprocating engine with respect to a second camshaft, a tensioning arrangement of the chain which winds around both camshafts is displaced transversely to the chain. The tensioning arrangement includes two hydraulic pistons which can be moved in mutually opposite directions, are braced with respect to one another by a helical spring and, for the adjusting, can be alternately acted upon by hydraulic pressure. The adjusting force acting upon the hydraulic pistons counteracts the spring force applied to the hydraulic pistons.

7 Claims, 4 Drawing Sheets

ARRANGEMENT FOR ADJUSTING THE RELATIVE ROTATING POSITION OF A CAMSHAFT

BACKGROUND AND SUMMARY OF THE INVENTION

The present invention relates to an arrangement for adjusting the relative rotation position of a first camshaft of a reciprocating engine with respect to a second camshaft, or a crankshaft, that drives the first camshaft by a chain, and has a tensioning arrangement. The tensioning arrangement has two coaxial hydraulic pistons provided on the chain, and a helical spring which can tension the hydraulic pistons in opposite directions to one another against the loose run and the load run of the chain. The tensioning arrangement, as a whole, can be displaced transversely with respect to the chain.

An adjusting arrangement of the above-described type, which is used for changing the valve timing, is shown in German Patent Document DE-PS 40 06 910. A hydraulic tensioning and adjusting arrangement acts upon a chain by means of a first camshaft is driven by a second camshaft which is disposed in parallel to the first camshaft. This tensioning and adjusting arrangement includes two hydraulic pistons which are disposed concentrically with respect to one another. By means of a helical pressure spring, which is disposed in the hollow space between the hydraulic pistons, the hydraulic pistons are displaced in opposite directions with respect to one another, in which case the tensioning shoes fitted onto the hydraulic pistons are braced against the two chain runs. The outer hydraulic piston has a collar, to the two front faces of which pressure ducts are applied which can be acted upon by hydraulic pressure. If the front faces are alternately supplied with pressure, the runs which are each situated in the moving direction of the piston will be lengthened while the opposite runs will be shortened correspondingly. As tests have demonstrated, the system acts asymmetrically in both adjusting directions. This could be confirmed by calculations (See FIG. 1). As indicated by curve a, the adjusting force increases progressively for an unfavorable adjusting direction, and when it approaches the stretched-out position of the opposite run, it will approach infinity. Even when the camshaft is rotated by 4 degrees out of the symmetrical position, the adjusting force is approximately three times as high as for an adjustment in the opposite direction. The adjusting time comparison determined in tests indicates a similar behavior with a ratio of 0.6 to 0.2 seconds.

The cause of the more favorable behavior in the opposite direction is the fact that in this case the adjusting force of the piston does not act upon the run in addition to the prestressing spring but instead reduces the force of the run on the opposite adjusting side. It is immediately understandable that, for achieving the stretched-out position of the opposite run maximally an adjusting force in the amount of the spring prestressing is required.

An object of the invention is to provide a tensioning and adjusting arrangement of this type in such a manner that the adjusting force and the adjusting time is the same and as low as possible in both adjusting directions.

This and other objects are achieved by the present invention which provides an arrangement for adjusting the relative rotating position of a first camshaft of a reciprocating engine with respect to a second camshaft driving the first camshaft, comprising a chain drivingly coupled to the first camshaft and having a loose run and a load run, and a tensioning arrangement. This tensioning arrangement has two coaxial hydraulic pistons that engage the chain, and a helical spring coupled to the hydraulic pistons so as to tension the hydraulic pistons in opposite directions to one another against the loose run and the load run, the tensioning arrangement being transversely displaceable with respect to the chain for adjusting the second camshaft. Each hydraulic piston has a front face, said front faces being arranged so as to be alternately acted upon by hydraulic pressure in such a manner that a pressure force acting upon the hydraulic pistons is directed against the force of the helical spring acting upon the hydraulic pistons.

When, for the adjustment of the chain, the front faces of both hydraulic pistons can be acted upon independently of one another with hydraulic pressure in such a manner that the pressure force counteracts the spring force loading the hydraulic pistons, by means of the adjusting force, the effective spring force is reduced and the run to be shortened can easily be moved in the direction of the stretched-out position. The adjusting force and the adjusting time are the same in both adjusting directions and are very low. The tensile stress occurring in the chain runs during the adjustment and the forces on the bearings of the camshaft are also correspondingly low. Since the adjusting force rises only slightly along the torsion angle of the camshaft and particularly there is no rise toward infinity, the adjusting range determined by the geometrical quantities can be exhausted completely. When the geometry is unchanged, the adjusting force can be reduced considerably in the previous unfavorable direction. On the other hand, when the previous maximum adjusting force is accepted, the gained potential may be utilized for a reduction of the overall size.

Other objects, advantages and novel features of the present invention will become apparent from the following detailed description of the invention when considered in conjunction with the accompanying drawings.

DETAILED DESCRIPTION OF THE DRAWINGS

Figure 1:
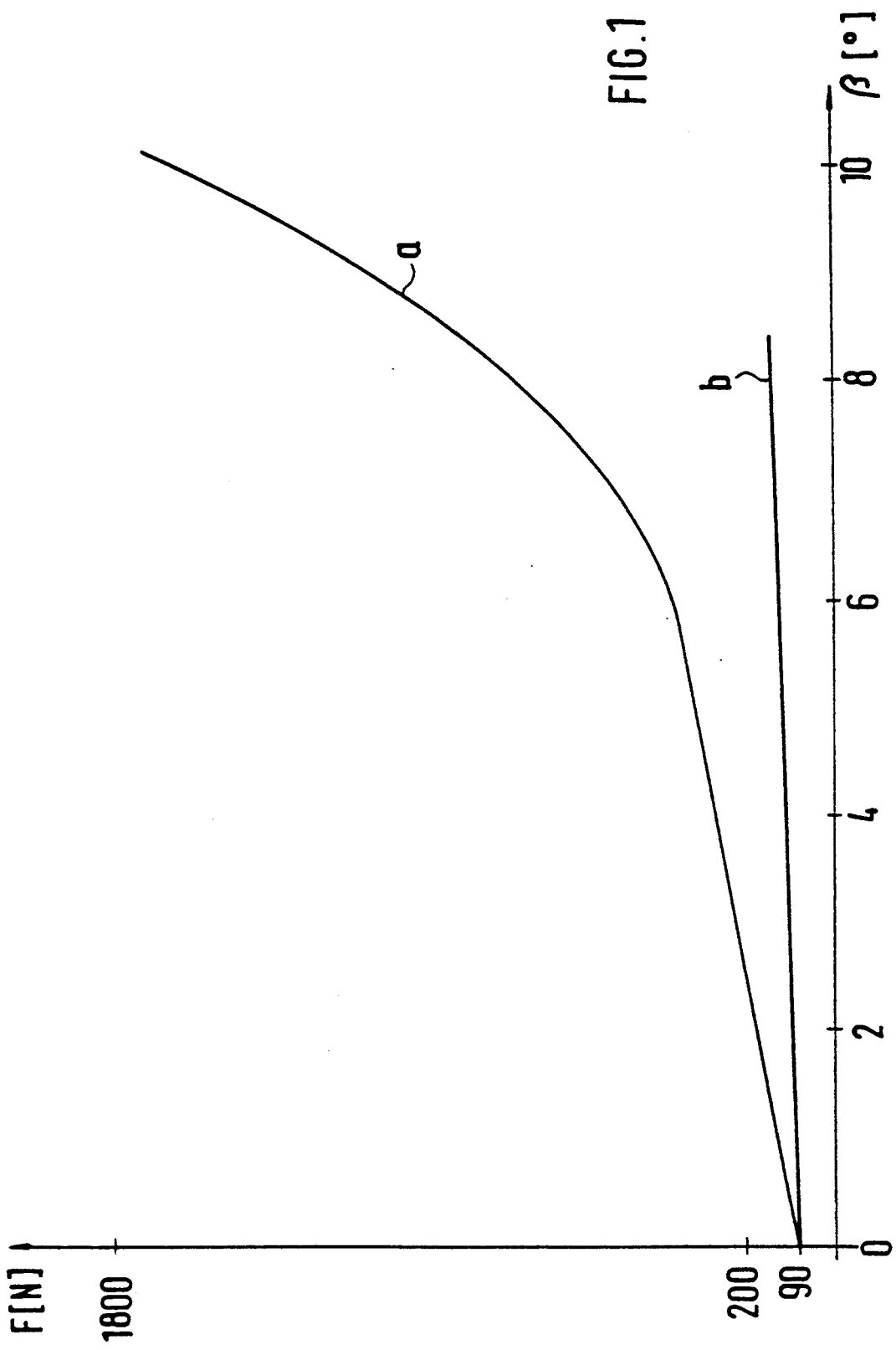
FIG. 1 is a diagram of the adjusting force as a function of the adjusting angle.

In the diagram of FIG. 1, curve a illustrates the adjusting force F as a function of the torsion angle $\beta$ of the camshaft, as it occurs in a tensioning and adjusting arrangement according to the earlier described German Patent Document DE-PS 40 06 910 when the loose run is shortened and is moved in the stretched position direction. Curve b illustrates the adjusting force F when the load run is moved in the direction of the stretched-out position. In this case, the tension force which acts upon the load run and is caused by a helical pressure spring counteracts the hydraulically applied adjusting force. Because of this, the required adjusting force is only slightly dependent on the torsion angle of the camshaft and, along the whole adjusting range, rises up to only 120N. By contrast, when the loose run is shortened, the adjusting force will increase progressively with the adjusting angle $\beta$ and, at $\beta = 10°$, reaches approximately 1,800N. A tensioning and adjusting arrangement of a camshaft drive constructed according to the invention is illustrated schematically in FIGS. 2 and 3 in both extreme positions of the adjustment.

An outlet camshaft 3 which actuates outlet valves is driven by a crankshaft 1 of a reciprocating engine by a toothed belt 2 or a chain. The outlet camshaft 3 drives an inlet camshaft 5 controlling the inlet valves via a chain 4. From the interior side of the chain, a tensioning arrangement 8 is applied to the loose run 6 and to the load run 7 of the chain 4.

The tensioning arrangement 8 comprises a first hollow hydraulic piston 9, a second hollow hydraulic piston 10 which is coaxial to the first hydraulic piston 9 and a helical pressure spring 12 which is braced in a hollow space between the hydraulic pistons 9, 10. A first tensioning shoe 13 tensions the loose run 6 and a second tensioning shoe 14 tensions the load run 7, these tensioning shoes 13, 14 being respectively fastened on the two hydraulic pistons 9, 10.

The hydraulic pistons 9, 10 are longitudinally guided in a stationary housing 15. Close to the front faces 9' and 10' of the hydraulic pistons 9, 10, the housing 15 has hydraulic connections 16 and 17 which are connected with a hydraulic valve 20 by pressure lines 18 and 19. The hydraulic valve 20 is controlled by an electromagnet 21 and is supplied with hydraulic fluid from a tank 23 by a pump 22.

Figure 2:
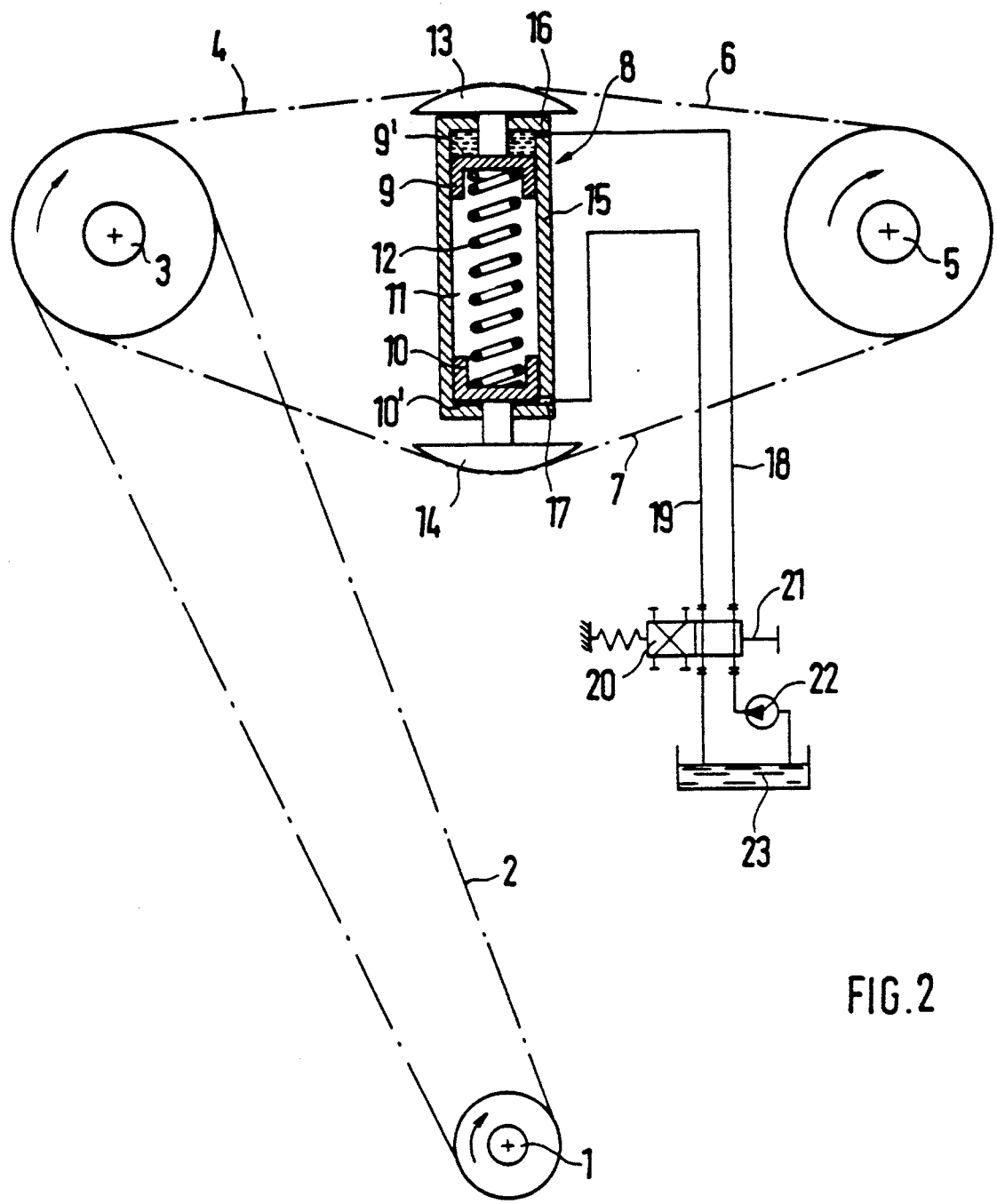
FIG. 2 is a view of the tensioning and adjusting arrangement of the present invention in one extreme position.
Figure 3:
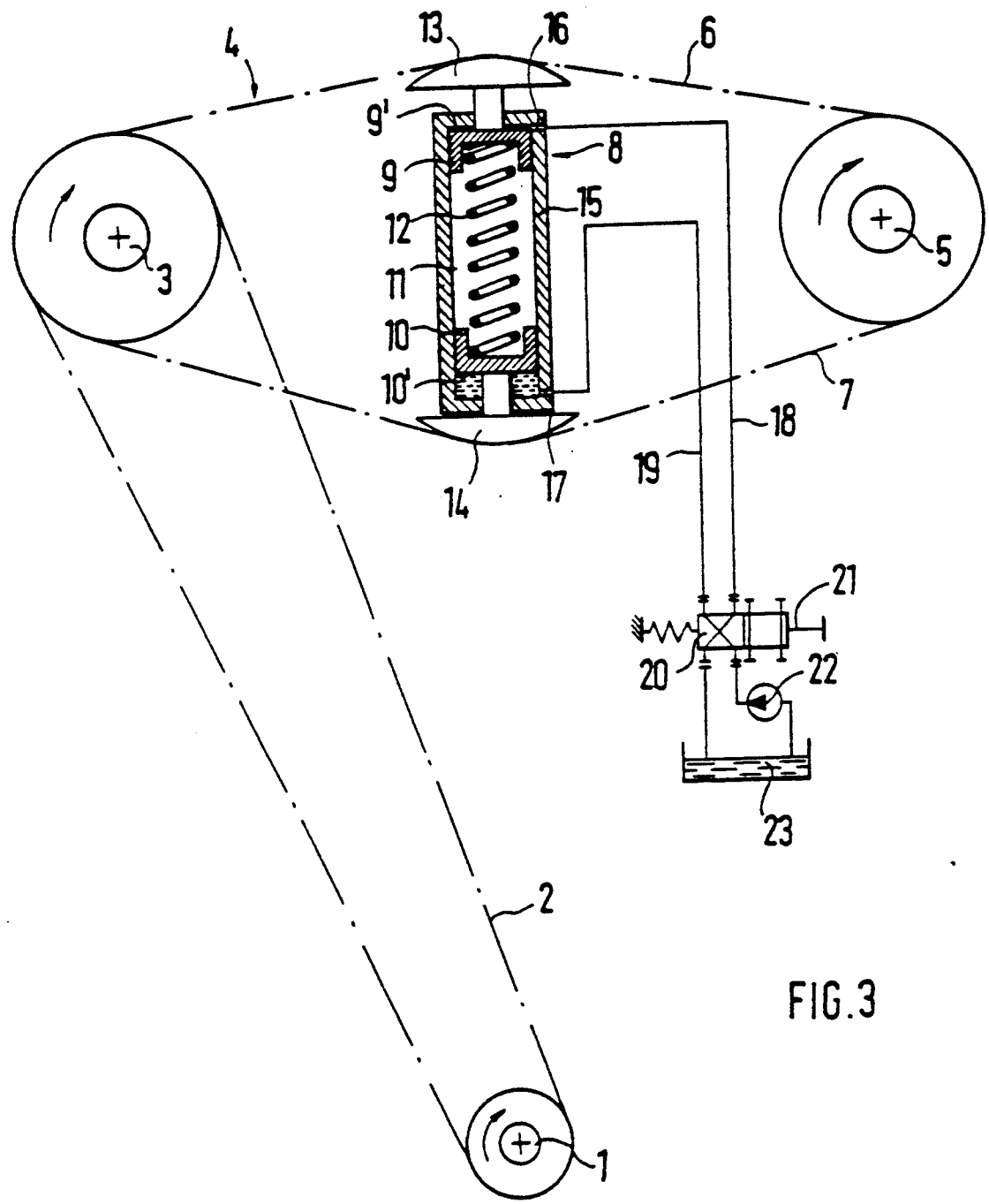
FIG. 3 is a view of the tensioning and adjusting arrangement of the present invention in another other extreme position.

In the position of the electromagnet according to FIG. 2, hydraulic pressure is supplied to the front face 9' of the hydraulic piston 9 via the pressure line 18. The resulting adjusting force counteracts the prestressing spring 12 and thus reduces the force acting upon the loose run 6. The resulting imbalance of the run forces causes a displacement in the load run 7 direction. Until the stretched-out position of the loose run 6 is reached, this displacement is possible without any considerable rise of the adjusting force. In the other position of the electromagnet 21 according to FIG. 3, the front face 10' of the hydraulic piston 10 is acted upon, so that the loose run 6 is bulged out and lengthened. Since the system has a symmetrical construction, the adjusting force is identical in both cases. It amounts to approximately 120N. The time required for the adjusting is also the same.

Figure 4:
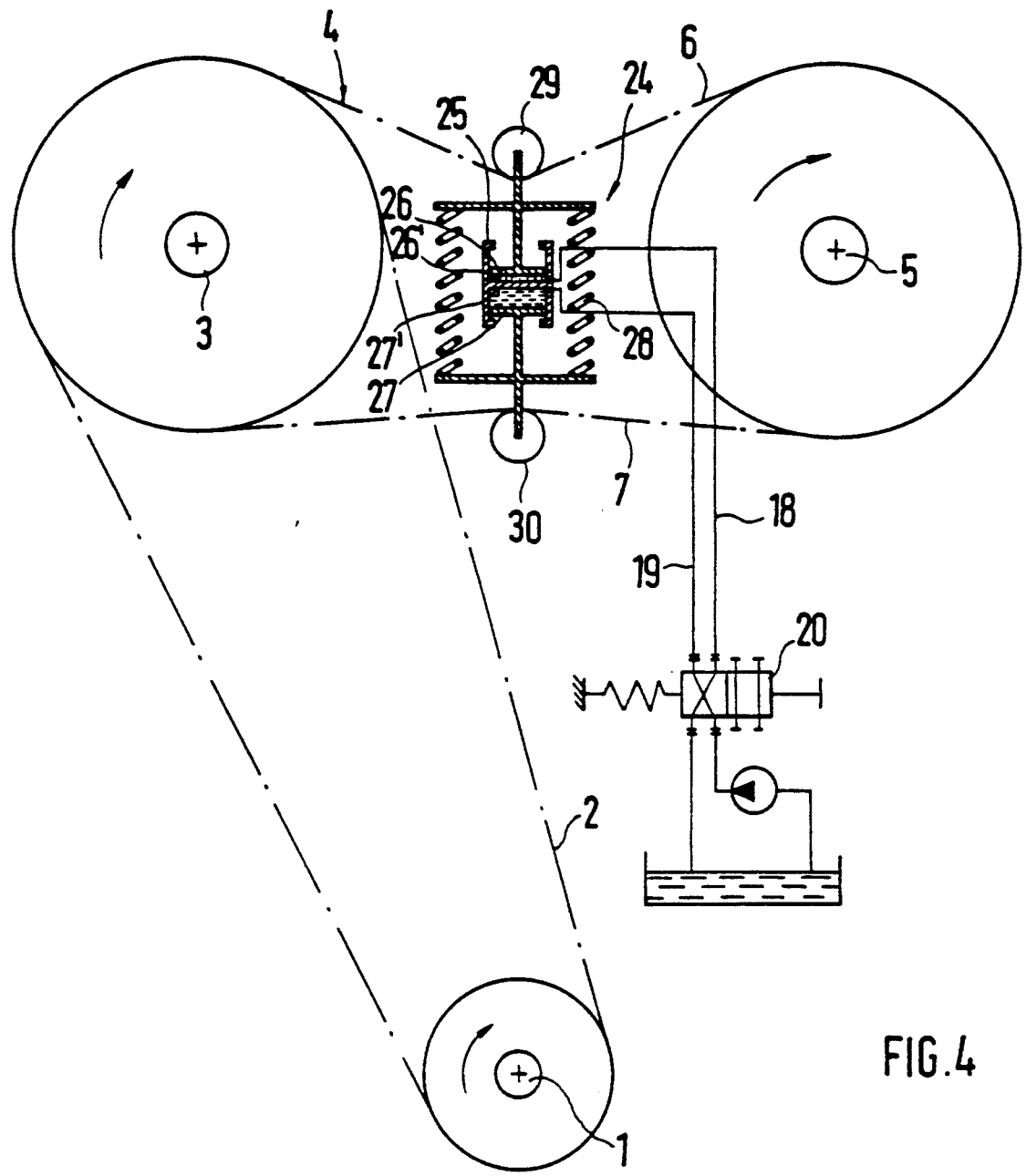
FIG. 4 is a view of tensioning and adjusting arrangements acting upon the exterior side of the chain in accordance with the present invention.

An alternative tensioning and adjusting arrangement for a camshaft drive is schematically illustrated in FIG. 4. The tensioning device 24, which is applied to the exterior side of the chain 4, comprises two hydraulic pistons 26 and 27. These hydraulic pistons 26, 27 are coaxially guided in a housing 25 and are tensioned with respect to one another by a helical tension spring 28. Tension rollers 29 and 30 fastened to the hydraulic piston brace the loose run 6 and the load run 7 of the chain 4 toward the inside. For hydraulic adjusting, the housing 25, also in this embodiment, has two hydraulic connections which are assigned to the front faces 26' and 27' of the hydraulic pistons 26 and 27 and which are connected via two pressure lines 18, and 19, to the electromagnetically controlled hydraulic valve 20. When one of the hydraulic pistons 26, 27 is acted upon by pressure, the adjusting force will counteract the spring tension force applied to it so that the adjusting force is also kept low in this embodiment of the invention. The adjusting force is the same for both adjusting directions for this embodiment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for adjusting the relative rotating position of a first camshaft of a reciprocating engine with respect to at least one of a second camshaft driving the first camshaft, comprising:
   a chain drivingly coupled between the first camshaft and the second camshaft and having a loose run and a load run;
   a tensioning arrangement having two coaxial hydraulic pistons engaging the chain, a helical spring coupled to the hydraulic pistons so as to tension the hydraulic pistons in opposite direction to one another against the loose run and the load run, the tensioning arrangement being transversely displaceable with respect to the chain for adjusting the first camshaft;
   wherein each hydraulic piston has a front face and said front faces are arranged to be acted upon by hydraulic pressure such that only one piston at one time is being acted upon by a pressure force of the hydraulic pressure directed against the force of the helical spring acting upon the hydraulic pistons.

2. An arrangement according to claim 1, wherein the hydraulic pistons are hollow pistons and are coupled to tension shoes, wherein the helical spring is a pressure spring that presses the tension shoes against interior sides of the loose run and the load run.

3. An arrangement according to claim 1, wherein the helical spring is a tension spring and the two hydraulic pistons are braced with respect to one another by said tension spring and further comprising tension rollers fastened on the hydraulic pistons, said tension rollers being pressed against exterior sides of the loose run and the load run.

4. An arrangement according to claim 1, further comprising a common stationary housing in which the two hydraulic pistons are longitudinally guided.

5. An arrangement according to claim 4, wherein the housing has two hydraulic connections by which the front faces of the hydraulic pistons can be acted upon by hydraulic pressure in the direction opposite to the force of the helical spring.

6. An arrangement according to claim 5, further comprising pressure lines and a hydraulic valve which is actuated electromagnetically as a function of the rotational speed of the engine, the hydraulic connections being connected to the hydraulic valve via said pressure lines.

7. An arrangement according to claim 6, wherein, when pressure is admitted to one of said pressure lines the other pressure line is used for pressureless oil return.

* * * * *